US012594717B2

(12) United States Patent (10) Patent No.: US 12,594,717 B2
Levin et al. (45) Date of Patent: Apr. 7, 2026

(54) ACRIFLAVINE FUSING AGENTS FOR THREE-DIMENSIONAL PRINTING

(71) Applicant: PERIDOT PRINT LLC, Palo Alto, CA (US)

(72) Inventors: Emily Levin, San Diego, CA (US); Emre Hiro Discekici, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 118 days.

(21) Appl. No.: 18/572,714

(22) PCT Filed: Jun. 28, 2021

(86) PCT No.: PCT/US2021/039346
§ 371 (c)(1),
(2) Date: Dec. 20, 2023

(87) PCT Pub. No.: WO2023/277860
PCT Pub. Date: Jan. 5, 2023

(65) Prior Publication Data

US 2024/0286346 A1 Aug. 29, 2024

(51) Int. Cl.
| | |
|---|---|
| *B29C 64/165* | (2017.01) |
| *B29C 64/188* | (2017.01) |
| *B29C 64/264* | (2017.01) |
| *B29C 64/314* | (2017.01) |
| *B29K 77/00* | (2006.01) |
| *B29K 105/00* | (2006.01) |
(Continued)

(52) U.S. Cl.
CPC .......... *B29C 64/165* (2017.08); *B29C 64/188* (2017.08); *B29C 64/264* (2017.08); *B29C 64/314* (2017.08); *B33Y 10/00* (2014.12); *B33Y 30/00* (2014.12); *B33Y 40/10* (2020.01); *B33Y 40/20* (2020.01); *B33Y 70/00* (2014.12); *B29K 2077/00* (2013.01); *B29K 2105/0032* (2013.01); *B29K 2105/251* (2013.01); *B29K 2995/002* (2013.01); *B29K 2995/0094* (2013.01)

(58) Field of Classification Search
CPC ... B29C 64/165; B29C 64/188; B29C 64/264; B29C 64/314; B33Y 10/00; B33Y 30/00; B33Y 40/10; B33Y 40/20; B33Y 70/00; B29K 2077/00; B29K 2105/0032; B29K 2105/251; B29K 2995/002; B29K 2995/0094
See application file for complete search history.

(56) References Cited

U.S. PATENT DOCUMENTS 3,097,096 A * 7/1963 Oster ...................... G03F 7/027
430/307
2015/0064398 A1 3/2015 Umebayashi
(Continued)

FOREIGN PATENT DOCUMENTS

| WO | 2017/069778 A1 | 4/2017 |
|---|---|---|
| WO | 2020/251528 A1 | 12/2020 |
| WO | 2021/010961 A1 | 1/2021 |

*Primary Examiner* — Michael M. Robinson
(74) *Attorney, Agent, or Firm* — Dierker & Kavanaugh, P.C.

(57) ABSTRACT

A fusing agent for three-dimensional printing can include an aqueous liquid vehicle and an acriflavine dye dissolved in the aqueous liquid vehicle. The aqueous liquid vehicle can include water, organic co-solvent, and surfactant.

14 Claims, 2 Drawing Sheets

(51) Int. Cl.

| | |
|---|---|
| *B33Y 10/00* | (2015.01) |
| *B33Y 30/00* | (2015.01) |
| *B33Y 40/10* | (2020.01) |
| *B33Y 40/20* | (2020.01) |
| *B33Y 70/00* | (2020.01) |

(56)                    References Cited

U.S. PATENT DOCUMENTS

| | | | |
|---|---|---|---|
| 2019/0047216 A1* | 2/2019 | Emamjomeh | .......... B33Y 10/00 |
| 2020/0299425 A1* | 9/2020 | Kobayashi | ........ C08F 222/1006 |
| 2021/0062027 A1* | 3/2021 | Watanabe | .............. C09D 11/54 |

\* cited by examiner

300

ACRIFLAVINE FUSING AGENTS FOR THREE-DIMENSIONAL PRINTING

BACKGROUND

Methods of three-dimensional (3D) digital printing, a type of additive manufacturing, have continued to be developed over the last few decades. Three-dimensional printing technology changes the product development cycle by allowing rapid creation of prototype models or even finished products. For example, several commercial sectors such as aviation and the medical industry, to name a few, have benefitted from rapid prototyping and/or the production of customized parts. There are various methods for three-dimensional printing that have been developed, including heat-assisted extrusion, selective laser sintering, photolithography, additive manufacturing, as well as others. As technology advances, higher demands with respect to production speed, part consistency, rigidity, method flexibility, etc., are requested by customers.

DETAILED DESCRIPTION

Figure 1:
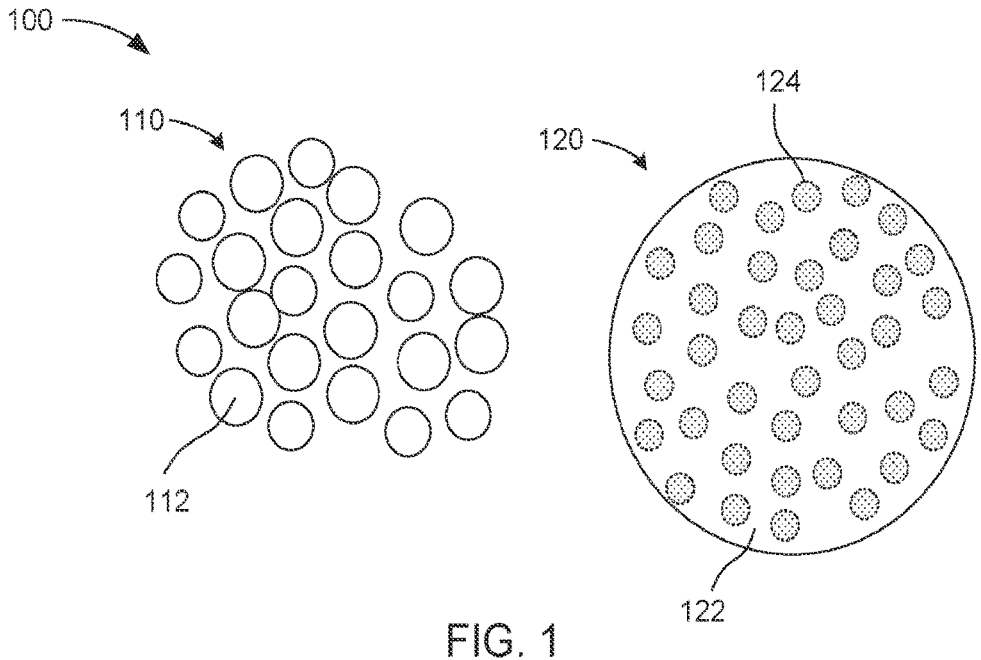
FIG. 1 schematically illustrates an example three-dimensional printing kit in accordance with the present disclosure.

The present disclosure is drawn to fusing agents for three-dimensional (3D) printing, three-dimensional printing kits, and methods for three-dimensional printing. More particularly, the fusing agents and three-dimensional printing kits can be used with HP's Multi-Jet Fusion (MJF) technology, for instance, where polymeric particles of a build material can be spread on a powder bed on a layer-by-layer basis. The various layers can be selectively contacted with a fusing agent which includes a radiation absorber. The fusing agent can be ejected from a fluid ejector such as an inkjet print head, for example, and the layer is then exposed to electromagnetic radiation to heat the layer of the build material. The radiation absorber can absorb the electromagnetic radiation and emit heat to the surrounding polymeric particles thereby fusing the adjacent polymeric particles to one another. This can be repeated layer-by-layer until a three-dimensional object is formed.

Fusing agents for three-dimensional printing include an aqueous liquid vehicle and an acriflavine dye dissolved in the aqueous liquid vehicle. The aqueous liquid vehicle includes water, organic co-solvent, and surfactant. In some examples, the acriflavine dye can be included in an amount from about 0.5 wt % to about 18 wt % with respect to the total weight of the fusing agent. In some examples, the organic co-solvent can be included in an amount from about 1 wt % to about 40 wt % and the surfactant can be included in an amount from about 0.1 wt % to about 5 wt % with respect to the total weight of the fusing agent. In certain examples, the acriflavine dye can be included in an amount from about 8 wt % to about 18 wt % with respect to the total weight of the fusing agent. In certain examples, the fusing agent does not include a pigment.

Three-dimensional printing kits include a polymer build material and a fusing agent. The polymer build material includes from about 80 wt % to 100 wt % polymeric particles and the fusing agent includes an aqueous liquid vehicle and an acriflavine dye dissolved in the aqueous liquid vehicle. In some examples, the polymeric particles can include at least one of polyacetals, polyacrylates, polybutylene terephthalates, polycarbonates, polyesters, polyether ketones, polyethylene terephthalates, polyethylenes, polypropylenes, polystyrenes, polyurethanes, thermoplastic polyurethanes, polyamides, thermoplastic polyamides, a copolymer thereof, or a mixture thereof.

In some examples, the aqueous liquid vehicle can include an organic co-solvent present in an amount from about 1 wt % to about 40 wt % with respect to the total weight of the fusing agent. In some examples, the three-dimensional printing kit can also include a second fluid agent, wherein the second fluid agent is at least one of a coloring agent that includes a liquid vehicle and a colorant, or a detailing agent that includes a detailing compound that reduces a temperature of the build material onto which the detailing agent is applied.

Methods for three-dimensional printing include iteratively applying individual build material layers of polymer build material particles to a powder bed. A fusing agent is iteratively and selectively dispensed, based on a three-dimensional object model, onto the individual build material layers. The fusing agent includes an aqueous liquid vehicle and an acriflavine dye dissolved in the aqueous liquid vehicle. The powder bed is iteratively exposed to light energy having a peak wavelength from about 365 nm to about 475 nm to selectively fuse the polymeric particles in contact with the acriflavine dye at the individual build material layers resulting in a fused three-dimensional object. In some examples, the light energy can be provided by a light emitting diode having peak emission wavelength of about 435 nm or about 445 nm or about 450 nm or about 455 nm or about 460 nm. In other examples, the method can also include pre-heating the polymer build material to a pre-heat temperature that is from about 5° C. to about 85° C. below a melting point of the polymeric particles. In further examples, based on the three-dimensional object model, the method further includes iteratively applying a second fluid agent to individual build material layers, wherein the second fluid agent is at least one of a coloring agent that includes a liquid vehicle and a colorant, or a detailing agent that includes a detailing compound that reduces a temperature of the build material onto which the detailing agent is applied.

It is noted that when discussing the three-dimensional printing kits, the methods for three-dimensional printing, and the three-dimensional printed objects, these discussions can be considered applicable to other examples, whether or not they are explicitly discussed in the context of that example. Thus, for example, in discussing a build material related to the three-dimensional printing kits, such disclosure is also relevant to and directly supported in context of the methods for three-dimensional printing and vice versa.

It is also understood that terms used herein will have the ordinary meaning in the relevant technical field unless specified otherwise. In some instances, there are terms defined more specifically throughout the specification or included at the end of the present specification, and thus, these terms have a meaning consistent with these more specific definitions.

Fusing Agents

The present disclosure sets forth fusing agents that can be used in three-dimensional printing. The fusing agent can be applied to a polymer powder bed material and the powder bed can be exposed to electromagnetic radiation. The fusing agents include a radiation absorber that absorbs the electromagnetic radiation and generates heat. This heat can fuse the polymer powder bed material together to form a solid polymer matrix. By selectively applying the fusing agent in certain areas of the powder bed, those areas can be fused while the surrounding areas of powder can remain unfused. This process can be repeated with multiple layers of powder bed material, until a complete three-dimensional printed object is formed of multiple fused layers.

The fusing agents described herein, in particular, can include an acriflavine dye as a radiation absorber. Acriflavine dyes can include various forms of acriflavine, including acriflavine, acriflavine chloride, and acriflavine hydrochloride. The acriflavine dye can absorb visible light with a wavelength range from about 350 nm to about 500 nm, with a peak absorption at about 445 nm to about 455 nm. Acriflavine can be particularly useful for absorbing light in this wavelength range, as the acriflavine has a higher absorbance in this range compared to other dyes and pigments. For example, the absorbance of acriflavine at 450 nm is about three times the absorbance of other selected yellow dyes at the same wavelength.

In some examples, the fusing agent including the acriflavine dye can be used together with an electromagnetic radiation source that matches the absorbance range of the acriflavine dye. When one of these sources of electromagnetic radiation is used, the acriflavine dye can absorb the radiation and convert it to heat very efficiently.

Additionally, many powder bed materials have an absorbance in the range of about 365 nm to about 475 nm that is much less than the absorbance of the acriflavine dye. Therefore, there can be a large difference in absorbance between powder bed material that has been treated with the acriflavine dye and clean powder bed material without the acriflavine dye. When radiation in the wavelength range of 365 nm to 475 nm is applied to the powder bed, the powder bed material with the acriflavine dye can be heated up quickly to the melting temperature of the polymer powder, while the powder bed material without the acriflavine dye can remain relatively cool. Thus, the fusing agents described herein can provide selectivity between the fused and unfused portions of the powder bed.

In some examples, the fusing agents described herein can be free of pigments. Compared to fusing agents that include pigments, such as carbon black, the fusing agents described herein can be easier to jet using fluid jetting architecture such as ink jet print heads and their residues can have little or no effect on the mechanical properties of the three-dimensional printed parts.

Moreover, using acriflavine dye as a radiation absorber in the fusing agent can also allow for more flexibility in formulating the fusing agent, because additional solid additives may be added to the fusing agent without making the fusing agent too difficult to jet and without their residues unduly altering the properties of the resulting three-dimensional printed objects. A variety of additives can be added to the fusing agent to provide various functions in three-dimensional printed objects. Such additives may be added in a greater amount than would be possible with a fusing agent that includes a solid pigment as the sole radiation absorber.

The acriflavine dye is highly soluble in water and aqueous liquid vehicles. In some examples, the fusing agents described here can include up to about 20 grams of acriflavine dye per 100 ml of fusing agent. Because the acriflavine dye can be included in high concentrations and because the acriflavine has an unusually high absorbance of light in the range of 365 nm to 475 nm, the fusing agents described herein need only be applied in relatively small amounts to the powder bed in order to provide sufficient heat generation for fusing the powder bed material. Using smaller amounts of fusing agent during the three-dimensional printing process can be useful because the evaporation of the liquid vehicle of the fusing agent cools the powder bed material, which counteracts the heating effect of the fusing agent. Therefore, if smaller amounts of fusing agent are applied then this undesired cooling is reduced and fusing can more efficient. Using smaller amounts of fusing agent can also reduce the impact of the fusing agent on the color of the three-dimensional printed object. This can be useful because the original color of the powder bed material may be desired, or in some cases coloring agents may be applied to color the three-dimensional printed object.

The amounts of the ingredients in the fusing agent can vary. In some examples, the acriflavine dye can be included in an amount from about 0.5 wt % to about 18 wt % with respect to the total weight of the fusing agent. In other examples, the acriflavine dye can be included in an amount from about 8 wt % to about 18 wt %, or from about 10 wt % to about 18 wt %, or from about 0.5 wt % to about 8 wt %, with respect to the total weight of the fusing agent. In further examples, the surfactant can be included in an amount from about 0.1 wt % to about 5 wt %, or from about 0.1 wt % to about 2 wt %, or from about 0.5 wt % to about 2 wt %. The organic co-solvent can be present in the aqueous liquid vehicle at from about 1 wt % to about 40 wt %, from about 5 wt % to about 35 wt %, from about 10 to about 35 wt %, or from about 5 wt % to about 15 wt %, for example. In some examples, the organic co-solvent can have a boiling point that can range from about 150° C. to about 300° C. In other examples, a boiling point of the organic co-solvent can range from about 160° C. to about 300° C., from about 180° C. to about 300° C., or from about 200° C. to about 280° C. In some examples, the organic co-solvent may act as a humectant preventing printheads from drying. The organic co-solvent may also act as a coalescing solvent which in conjunction with the acriflavine dye can provide binding to the particulate build material.

Additional detail regarding the fusing agent is included elsewhere herein in the context of the three-dimensional printing kits and methods. The additional details include specific examples of surfactants, and other ingredients that can be included in the fusing agent.

Three-Dimensional Printing Kits

Turning now to more detail regarding the three-dimensional printing kits, FIG. 1 shows an example three-dimensional printing kit 100 including a build material 110 including from about 80 wt % to 100 wt % polymeric particles 112 having a D50 particle size from about 10 μm to about 150 μm. The three-dimensional printing kit can further include a fusing agent 120 including an aqueous liquid vehicle 122 and an acriflavine dye 124 dissolved in the aqueous liquid vehicle. The acriflavine dye can provide radiation absorbing capability to receive electromagnetic radiation with a peak emission within the range of about 365 nm to about 475 nm in some examples, which causes the acriflavine dye to become heated, providing a sufficient temperature boost to cause the polymeric particles to become heat melted or fused. For example, by application of electromagnetic energy within one of these ranges at an energy level from about 2 $W/cm^2$ to about 30 $W/cm^2$ with and an irradiation application time (or dwell time) of about 0.03 second to about 10 seconds, the polymeric particles of the build material can be sufficiently heated to cause intra-layer heat fusion as well as inter-layer fusion (from layer to layer), such as by the melting together of particles and layers. In some examples, the electromagnetic energy can be applied in a single pass or multiple passes. For example, multiple passes can be performed with a relatively short dwell time per pass. Alternatively, a single pass can be performed with a longer dwell time.

In further detail regarding the build material 110, the polymeric particles can be present at from about 80 wt % to 100 wt %, from about 90 wt % to 100 wt %, from about 95 wt % to about 100 wt %, from about 80 wt % to about 90 wt %, from about 85 wt % to about 95 wt %, or at about 100 wt %. Other particles other than the polymeric particles can be included such as filler, charging particles, flow aid particles, etc., as described in detail hereinafter.

The polymeric particles can include at least one of polyacetal, polyacrylate, polyamide, polybutylene terephthalate, polycarbonate, polyester, polyether ketone, polyethylene terephthalate, polyethylene, polypropylene, polystyrene, polyurethane, thermoplastic polyamides, thermoplastic polyurethane, copolymers thereof, blends of any of the multiple polymers listed herein, as well as mixtures thereof. In some examples, the polymeric particles can include a polyamide, and the polyamide can include at least one of polyamide-6, polyamide-9, polyamide-11, polyamide-12, polyamide-66, polyamide-612, or a combination thereof. In other examples, the polymeric particles can include at least one of a polyacrylate, polybutylene terephthalate, polycarbonate, polyester, polyethylene, polystyrene, polyurethane, copolymers thereof, blends of any of the multiple polymers listed herein, as well as mixtures thereof. Core shell polymer particles of these materials may also be used. In some examples, the build material does not include amorphous materials.

The polymeric particles (and/or other particles if present) of the build material can have a D50 particle size that can range from about 10 µm to about 150 µm. The polymeric particles can have a D50 particle size that can range from about 10 µm to about 150 µm, from about 10 µm to about 100 µm, from about 20 µm to about 80 µm, from about 30 µm to about 50 µm, from about 25 µm to about 75 µm, from about 40 µm to about 80 µm, from about 50 µm to about 75 µm, from about 75 µm to about 150 µm, from about 60 µm to about 90 µm, or from about 100 µm to about 150 µm, for example. The terms "size" or "particle size," as used herein, refer to the diameter of a substantially spherical particle, or the effective diameter of a non-spherical particle, e.g., the diameter of a sphere with the same mass and density as the non-spherical particle as determined by weight. Particle size information can be determined and/or verified using a scanning electron microscope (SEM), or can be measured using a particle analyzer such as a MASTERSIZER™ 3000 available from Malvern Panalytical, for example. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can analyze the angular scattering data to calculate the size of the particles using the Mie theory of light scattering. Particle size can be reported as a volume equivalent sphere diameter. In some examples, an average particle size can refer to a mathematical average of the particle sizes, which is normally about the D50 particle size, but can be different depending on the particle size distribution.

That being stated, an example Gaussian-like distribution of the particles can be characterized using "D10," "D50," and "D90" particle size distribution values, where D10 refers to the particle size at the $10^{th}$ percentile, D50 refers to the particle size at the $50^{th}$ percentile, and D90 refers to the particle size at the $90^{th}$ percentile. For example, a D50 value of about 25 µm means that about 50% of the particles (by number) have a particle size greater than about 25 µm and about 50% of the particles have a particle size less than about 25 µm. Particle size distribution values are not necessarily related to Gaussian distribution curves. In practice, true Gaussian distributions are not typically present, as some skewing can be present, but still, the Gaussian-like distribution can be considered to be "Gaussian" as used in practice. Particle size distribution can be expressed in terms of D50 particle size, which can approximate average particle size, but may not be the same.

A shape of the particles of the build material can be at least one of spherical, irregular spherical, rounded, semi-rounded, discoidal, angular, subangular, cubic, cylindrical, or any combination thereof. In some examples, the particles can include at least one of spherical particles, irregular spherical particles, or rounded particles. In some examples, the shape of the particles can be uniform or substantially uniform, which can allow for relatively uniform melting of the particles.

The polymeric particles in the build material can have a melting point that can range from about 75° C. to about 350° C., from about 100° C. to about 300° C., or from about 150° C. to about 250° C. As examples, the build material can be a polyamide having a melting point of about 170° C. to about 190° C., or a thermoplastic polyurethane that can have a melting point ranging from about 100° C. to about 165° C. A variety of thermoplastic polymers with melting points or softening points in these ranges can be used. In some examples, the build material can include polyamide particles, such as polyamide-12, which can have a melting point from about 175° C. to about 200° C. In other examples, elastomers such as thermoplastic polyamides can be used, which may have a melting point from about 135° C. to about 210° C. in some examples.

The build material may include, in addition to the polymeric particles, other particles such as filler particles, charging particles, flow aid particles, or a combination thereof. Charging particles, for example, may be added to suppress tribo-charging. Examples of suitable charging particles include at least one of aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging particles include HOSTASTAT® FA 38 (natural based ethoxylated alkylamine), HOSTASTAT® FE2 (fatty acid ester), and HOSTASTAT® HS 1 (alkane sulfonate), both from Clariant Int. Ltd. (North America). In some examples, if added, the charging particles can be included in an amount ranging from greater than 0 wt % to about 20 wt %, from about 0.1 wt % to about 10 wt %, or from about 0.2 to about 5 wt %, based upon the total wt % of the build material.

Flow aid particles may be added to increase the coating flowability of the build material. Flow aid particles may be particularly desirable when the particles of the build material are on the smaller end of the particle size range. The flow aid particles can increase the flowability of the build material by reducing friction, lateral drag, and tribocharge buildup (by increasing the particle conductivity) Examples of suitable flow aid particles include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium alumi-nosilicate (E554), potassium aluminum silicate (E555), cal-cium aluminosilicate (E556), bentonite (E558), aluminum silicate (E559), stearic acid (E570), or polydimethylsiloxane (E900). In some examples, if added, the flow aid particles can be included in an amount ranging from greater than 0 wt % to about 20 wt %, from about 0.1 wt % to about 10 wt %, or from about 0.2 to about 5 wt %, based upon the total wt % of the build material.

The acriflavine dye can provide a temperature boosting capacity sufficient to increase the temperature of the build material above the melting or softening point of the poly-meric particles therein. As used herein, "temperature boost-ing capacity" refers to the ability of the acriflavine dye as a fusing compound to convert radiation in the range of about 365 nm to about 475 nm into thermal energy to increase the temperature of the polymeric particles of the build material on which it is printed over and above the temperature of an unprinted portion of the build material. Typically, the build material can be fused together when the temperature increases to or above the melting or softening temperature of a polymer of the polymeric particles, but fusion can also occur in some instances below the melting point. As used herein, "melting point" refers to the temperature at which a polymer transitions from a crystalline phase to a pliable, amorphous phase. Some polymers do not have a melting point, but rather have a range of temperatures over which the polymers soften. This range can be segregated into a lower softening range, a middle softening range, and an upper softening range. In the lower and middle softening ranges, the polymeric particles in contact with the acriflavine dye particles can coalesce to form a layer of a three-dimensional part while the remaining polymeric particles can remain loose.

As used herein, "peak absorption" indicates a wavelength or wavelength range at which the acriflavine dye absorbs more radiation energy than at other wavelengths. In some examples, from about 20% to about 100% of light emitted at the peak wavelength can be absorbed by the acriflavine dye. In other examples, at least about 50%, at least about 70%, at least about 80%, at least about 90%, at least about 95%, or 100% of the light emitted at the peak wavelengths emitted by an energy source can be absorbed by the acri-flavine dye. The acriflavine dye can exhibit absorption at other wavelengths outside of this range, but the acriflavine dye can exhibit at least one absorption peak of from about 50% to 100% absorption within the range of about 365 nm to about 475 nm, or from about 445 nm to about 455 nm, and the absorption can be sufficient to cause the polymeric particles of the build material to become intra-layer and inter-layer heat-fused to form a multi-layered three-dimen-sional object. In further detail, when fusing the build mate-rial, a certain minimum amount of radiation ($J/cm^2/sec$) can be used to cause fusing. Whether that amount comes from 20% or 80% or 100% of the incoming radiation that is absorbed (e.g., such as from inherent material absorption subtracting reflection, etc.), as long as there is enough radiation used, fusing can occur. The term "fuse" or "fusing" when referring to the build material indicates that polymeric particles are fully or partially melted together so that that they become joined, and thus upon cooling, the three-dimensional printed objects formed are in the form of a monolithic mass polymer (whether the particles were fully melted or partially melted and joined at their surfaces). The term "fusing agent" should not be confused with a descrip-tion of "fusing" of the polymeric particles. For example, the fusing agent containing acriflavine dye is used to absorb electromagnetic energy and convert that energy to heat so that at locations where it is applied to layers of the build material, the polymer particles can become fused, e.g., melted, together.

As used herein, "absorbance" indicates the capacity of the acriflavine dye to absorb light, and can be measured using a UV-visible spectrophotometer such as Cary 5000 spectrom-eter, for example. In some examples, the acriflavine dye can have an absorbance greater than about 0.5, e.g., from about 0.5 to about 2.0, from about 0.5 to about 1.5, or from about 1 to about 1.5 at the peak absorbance wavelength of the acriflavine dye. This absorbance can be measured for a 10 wt % solution of acriflavine dye in water. The true absorbance of the acriflavine dye in the fusing agent can depend on the concentration of acriflavine dye in the fusing agent.

In various examples, the fusing agent can include the acriflavine dye and an aqueous liquid vehicle, which can be water or can include water with other ingredients. One practical approach is to form the fusing agent by adding additional carrier components to a solution of acriflavine dye in water. Thus, combining the additional carrier components with the water in the solution can form an aqueous liquid vehicle for the fusing agent. The aqueous liquid vehicle, once formed, can include water as a major solvent, e.g., the solvent present at the highest concentration when compared to other co-solvents. The aqueous liquid vehicle can be present in the fusing agent at from about 50 wt % to about 99.9 wt %. Water may be included in the fusing agent at from about 10 wt % to about 99.9 wt %, from about 10 wt % to about 80 wt %, from about 50 wt % to about 99.9 wt %, from about 60 wt % to about 98 wt %, from about 60 wt % to about 95 wt %, or from about 50 wt % to about 85 wt %, based on a total weight of the fusing agent.

Apart from water, the aqueous liquid vehicle may further include organic co-solvent. In some examples, the organic co-solvent can be selected from a polyol, an oligoglycol, or a lactam. In other examples, the organic co-solvent can be a polyol. In some examples, the organic co-solvent can include at least one of diols; 1,2 butanediol; 1,2-propanediol; 2,3-butanediol; 1,2-pentanediol; 2-methyl-2,4-pentanediol; 2-methyl-1,3-propanediol; triols; tetrahydrofuran; ethylene glycol dimethyl ether; ethylene glycol diethylene glycol; triethylene glycol; propylene glycol; tripropylene glycol butyl ether, lactams; 2-pyrrolidone; 1-(2-hydroxyl)-2-pyr-rolidone; or a combination thereof. In other examples, the organic co-solvent can be a diol and the diol can be at least one of 1,2 butanediol; 1,2-propanediol; 2,3-butanediol; 1,2-pentanediol; 2-methyl-2,4-pentanediol; 2-methyl-1,3-pro-panediol; or a combination thereof. In other examples, the organic co-solvent can be 1,2-butanediol. In other examples, the organic co-solvent can be propylene glycol.

In other examples, the aqueous liquid vehicle can further include from about 0.1 wt % to about 10 wt % of other liquid components based on a total weight of the fusing agent. The other liquid components can include surfactant, dispersant, additive that inhibits growth of harmful microorganisms, pH adjuster, buffer, viscosity modifier, sequestering compound, preservative, etc.

Examples of surfactants can include a non-ionic surfactant, a cationic surfactant, and/or an anionic surfactant. Example non-ionic surfactants can include self-emulsifiable, nonionic wetting agents based on acetylenic diol chemistry (e.g., SURFYNOL® SEF from Air Products and Chemicals, Inc., USA), a fluorosurfactant (e.g., CAPSTONE® fluorosurfactants from DuPont, USA), or a combination thereof. In other examples, the surfactant can be an ethoxylated low-foam wetting agent (e.g., SURFYNOL® 440, SURFY-NOL® 465, or SURFYNOL® CT-111 from Air Products and Chemical Inc., USA), or an ethoxylated wetting agent and molecular defoamer (e.g., SURFYNOL® 420 from Air Products and Chemical Inc., USA). Still other examples of surfactants can include wetting agents and molecular defoamers (e.g., SURFYNOL® 104E from Air Products and Chemical Inc., USA), alkylphenylethoxylates, solvent-free surfactant blends (e.g., SURFYNOL® CT-211 from Air Products and Chemicals, Inc., USA), water-soluble surfactant (e.g., TERGITOL® TMN-6, TERGITOL® 15S7, and TERGITOL® 15S9 from The Dow Chemical Company, USA), or a combination thereof. In other examples, the surfactant can include a non-ionic organic surfactant (e.g., TEGO® Wet 510 from Evonik Industries AG, Germany), a non-ionic secondary alcohol ethoxylate (e.g., TERGITOL® 15-S-5, TERGITOL® 15-S-7, TERGITOL® 15-S-9, and TERGITOL® 15-S-30 all from Dow Chemical Company, USA), or a combination thereof. Example anionic surfactants can include alkyldiphenyloxide disulfonate (e.g., DOWFAX® 8390 and DOWFAX® 2A1 from The Dow Chemical Company, USA), oleth-3 phosphate surfactant (e.g., CRODAFOS™ N3 Acid from Croda, UK), and dioctyl sulfosuccinate sodium salt. Example cationic surfactant can include dodecyltrimethylammonium chloride, hexadecyldimethylammonium chloride, or a combination thereof. In some examples, the surfactant can include a co-polymerizable surfactant. Co-polymerizable surfactants can include polyoxyethylene alkylphenyl ether ammonium sulfate, sodium polyoxyethylene alkylether sulfuric ester, polyoxyethylene styrenated phenyl ether ammonium sulfate, or mixtures thereof. In some examples, the surfactant (which may be a blend of multiple surfactants) may be present in the fusing agent at an amount ranging from 0.01 wt % to 5 wt %, from 0.05 wt % to 2 wt %, or from 0.01 wt % to 1 wt %.

Some example additives that can inhibit the growth of harmful microorganisms can include biocides, fungicides, and other microbial agents. Example antimicrobial agents can include at least one of NUOSEPT® (Ashland Inc., USA), VANCIDE® (R.T. Vanderbilt Co., USA), ACTI-CIDE® B20 and ACTICIDE® M20 (Thor Chemicals, U.K.), PROXEL® GXL (Arch Chemicals, Inc., USA), BARDAC® 2250, 2280, BARQUAT® 50-65B, and CARBOQUAT® 250-T, (Lonza Ltd. Corp., Switzerland), KORDEK® MLX (The Dow Chemical Co., USA), and a combination thereof. In some examples, if included, a total amount of antimicrobial agents in the fusing agent can range from 0.01 wt % to 3 wt %.

In some examples, an aqueous liquid vehicle may further include a pH adjuster or buffer. The pH adjuster can be any compound that raises or lowers the pH when added in relatively small amounts, e.g., 0.01 wt % to about 1 wt %. The buffer, if used, can be provided to withstand small changes (e.g., less than 1) in pH when small quantities of a water-soluble acid or a water-soluble base are added to a composition containing the buffer. The buffer can have a pH that can range from 5 to 9.5, from 7 to 9, or from 7.5 to 8.5. In some examples, the buffer can include a poly-hydroxy functional amine. In other examples, the buffer can include potassium hydroxide, 2-[4-(2-hydroxyethyl) piperazin-1-yl] ethane sulfonic acid, 2-amino-2-(hydroxymethyl)-1,3-propanediol (TRIZMA® sold by Sigma-Aldrich, USA), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N,N'N'-tetrakis-(2-hydroxyethyl)-ethylenediamine and N,N,N'N'-tetrakis-(2-hydroxypropyl)-ethylenediamine, beta-alanine, betaine, or mixtures thereof. In other examples, the buffer can include 2-amino-2-(hydroxymethyl)-1,3-propanediol (TRIZMA® sold by Sigma-Aldrich, USA), beta-alanine, betaine, or mixtures thereof.

In some specific examples, the three-dimensional printing kit can include additional fluids or agents, such as coloring agents to impart color, detailing agents to provide more detailed printing at or near the border of the three-dimensional printed object, or the like. A coloring agent, if present, can include an aqueous liquid vehicle similar to that used in the fusing agent and a colorant, such as a pigment and/or a dye. As the printed three-dimensional parts of the present disclosure can be lightly colored after fusion, a coloring agent can be used with good success in providing color, even multi-colored portions, to the three-dimensional object.

The detailing agent, on the other hand, can include a detailing compound. The detailing compound can reduce a temperature of the build material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

The detailing compound can be water and/or an organic co-solvent that can evaporate at the temperature of the powder bed. In some cases the powder bed can be preheated to a preheat temperature within about 5° C. to about 85° C. of the fusing temperature of the polymeric particles. Depending on the type of polymeric particles used, the preheat temperature can be in the range of about 90° C. to about 200° C. or higher. The detailing compound can be a solvent that can evaporate when it comes into contact with the powder bed at the preheat temperature, thereby cooling the printed portion of the powder bed through evaporative cooling.

In certain examples, the detailing agent can include water, co-solvents, or a combination thereof. In some examples, the detailing agent can be mostly water. For example, the detailing agent can be from about 85 wt % to 100 wt %, or from about 85 wt % to about 99 wt % water. In further examples, the detailing agent can be from about 95 wt % to 100 wt %, or from about 95 wt % to 99 wt % water.

In some examples, the detailing agent can include a co-solvent. The co-solvent can be as identified above. In other examples, co-solvents for use in the detailing agent can include at least one of xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and a combination thereof. The co-solvent may be present in the detailing agent at from about 1 wt % to about 15 wt %, at from about 5 wt % to about 10 wt %, at from about 1 to about 10 wt %, or from about 5 wt % to about 15 wt %.

In still further examples, the detailing agent can be substantially devoid of acriflavine dye or other radiation absorbers. That is, in some examples, the detailing agent can be substantially devoid of ingredients that absorb enough radiation energy to cause particles of the build material to fuse or adhere to one another. For example, the detailing agent can be devoid of carbon black pigment or other black pigment or dye. However, in some examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead, e.g., piezo- or thermal-printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Three-Dimensional Printing Methods

Figure 2:
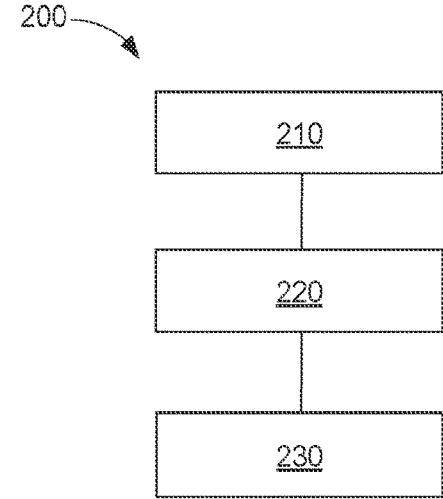
FIG. 2 schematically illustrates an example method for three-dimensional printing in accordance with the present disclosure.

An example method for three-dimensional printing is illustrated schematically at 200 in FIG. 2. The method can include iteratively applying individual build material layers of a polymer build material including from about 80 wt % to 100 wt % polymeric particles to a powder bed 210; based on a three-dimensional object model, iteratively and selectively dispensing a fusing agent onto the individual build material layers, wherein the fusing agent includes an aqueous liquid vehicle and an acriflavine dye dissolved in the aqueous liquid vehicle 220; and iteratively exposing the powder bed to light energy having a peak wavelength from about 365 nm to about 475 nm to selectively fuse the polymeric particles in contact with the acriflavine dye at the individual build material layers resulting in a fused three-dimensional object 230.

After the fusing agent is dispensed onto the powder bed, an electromagnetic energy source can be used to expose the powder bed to the radiation energy and to selectively fuse portions of individual layers of the build material together to form the three-dimensional object. The electromagnetic radiation source can be a static light source or lamp or can travel laterally by carriage along with the fluid ejectors. The electromagnetic radiation source can produce light having a wavelength in the range of about 365 nm to about 475 nm, in some examples. More particularly, the light can have a peak wavelength in this range. In further examples, the light can have a peak wavelength in the range of about 400 nm to about 470 nm, or about 435 nm to about 465 nm, or about 445 nm to about 455 nm. In certain examples, the electromagnetic radiation source can include a light emitting diode that produces light in one of the above ranges. In certain examples, the light emitting diode can have a peak emission wavelength of about 435 nm, or about 445 nm, or about 450 nm, or about 455 nm, or about 460 nm. In some examples, a single light emitting diode can be used as an electromagnetic radiation source. In other examples, an array of light emitting diodes can be used, such as a row of light emitting diodes that is moveable across the powder bed, or a two-dimensional array of light emitting diodes that simultaneously exposes the entire power bed.

In other examples, the method can further include holding the build material at an elevated temperature less than the melting temperature of the polymeric particles to remove volatile fusing agent components applied thereon during printing. Heat can be applied to the build material to bring the build material to a temperature near its fusing temperature, making it easier to bring up a temperature enough to generate fusion of the build material. For example, heat may be applied to the build material in the powder bed from the build platform, from above, or to the polymeric build material prior to being spread on the powder bed to preheat the polymeric build material within about 5° C. to about 85° C. of a fusing temperature of the polymeric particles so that less energy is required to bring the polymeric particles to their fusing temperature.

In other examples, the method can further include iteratively applying a second fluid agent to individual build material layers. The second fluid agent can be, for example, a coloring agent, that includes a liquid vehicle and a colorant (to impart color to the three-dimensional object), or a detailing agent that includes a detailing compound that reduces the temperature of the build material onto which the detailing agent is applied. Printing a detailing agent at or near a border can increase the definition of the three-dimensional object at the edge and can permit a formation of a smooth edge at the printed three-dimensional object.

Figure 3:
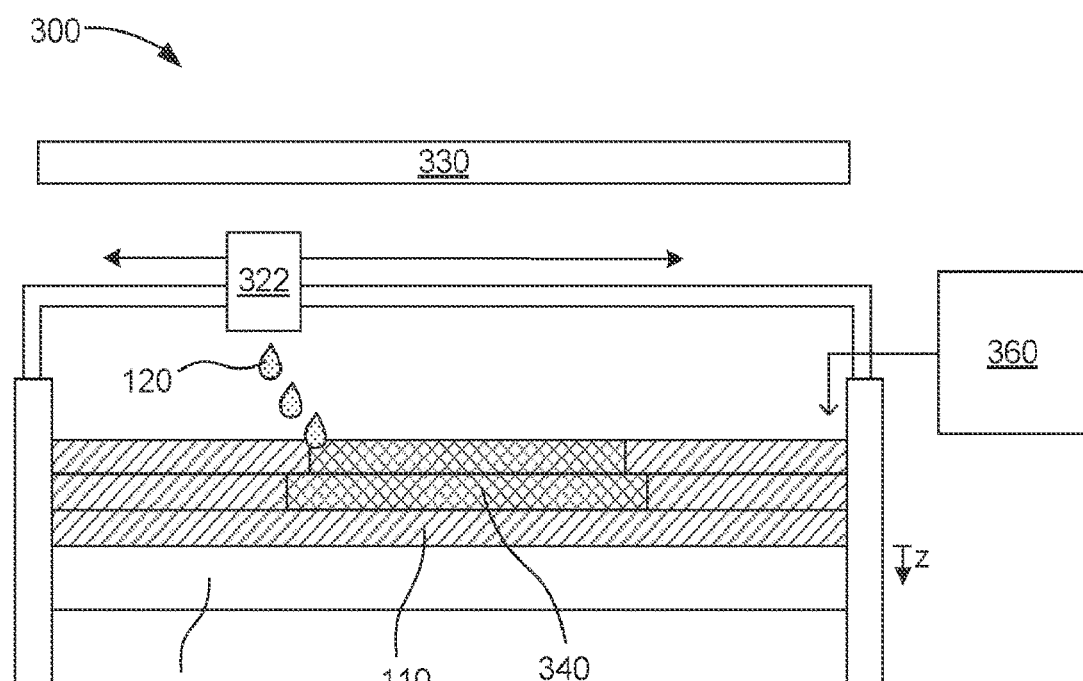
FIG. 3 schematically illustrates an example three-dimensional printing system usable in the method of FIG. 2 in accordance with the present disclosure.

Turning now to FIG. 3, a three-dimensional printing system 300 is shown by way of example to illustrate further the three-dimensional printing kits and method of three-dimensional printing described herein. For example, the three-dimensional printing system can include a build material 110, a fusing agent 120, a fluid applicator 322, and an electromagnetic energy source 330. The fluid applicator can be fluidly coupled to or fluidly coupleable to the fusing agent to selectively and iteratively eject the fusing agent onto successively placed individual layers of the build material and the electromagnetic energy source can be positioned to expose the individual layers of the build material to radiation energy to selectively fuse the polymeric particles in contact with the fusing agent to iteratively form a three-dimensional object 340. The build material and fusing agent can be as described above with respect to the three-dimensional printing kit. The three-dimensional printing system can also further include a second fluid, such as a coloring agent and/or a detailing agent (not shown) as described previously.

The fluid applicator in further detail is capable of selectively dispensing or applying a fluid agent. For example, the fluid applicator can be a fluid ejector or digital fluid ejector, such as an inkjet print head, e.g., a piezoelectric print head, a thermal print head, a continuous print head, etc. The fluid applicator could likewise be a sprayer, a dropper, or other similar structure for applying a fluid agent to the polymeric build material.

The fluid applicator can be supported by any suitable structure, such as by being located on a carriage track.

In some examples, as further illustrated in FIG. 3, the three-dimensional printing system can include, in addition to the fluid applicator and three-dimensional printing kit, a build platform 350 that can support a powder bed of build material. The build platform can be positioned to receive the fusing agent from the fluid applicator onto the build material. The build platform can be configured to drop in height (shown at "z"), thus allowing for successive layers of build material to be applied by a spreader 360. The build material can be layered in the build platform at a thickness that can range from about 5 μm to about 1 mm. In some examples, individual layers can have a relatively uniform thickness. In some examples, a thickness of a layer of the particulate build material can range from about 10 μm to about 500 μm, from about 50 μm to about 400 μm, from about 50 μm to about 300 μm, from about 60 μm to about 200 μm, or from about 70 μm to about 150 μm.

In other examples, three-dimensional printed objects can be made using the methods described herein. A three-dimensional printed object can include multiple fused polymeric layers that are also fused to one another. The individual fused polymeric layers include a fused composite of polymeric particles and acriflavine dye. In examples herein, the polymeric particles (or fused polymer) to acriflavine content weight ratio can be from about 10,000:1 to about 9:1. In the three-dimensional printed object, a weight ratio of 10,000:1 can be achieved with lower fusing agent depositions (lower contone application) and lower concentrations of acriflavine dye in the fusing agent. Conversely, the 9:1 weight ratio may represent a higher fusing agent deposition (higher contone application) with a higher concentration of an acriflavine dye in the fusing agent. Other weight ratio ranges of (fused) polymeric particles to acriflavine dye found in the three-dimensional printed object can be from about 15:1 to about 8,000:1, from about 20:1 to about 5,000:1, from about 50:1 to about 3,500:1, or from about 100:1 to about 2,500:1, for example.

Definitions

It is noted that, as used in this specification and the appended claims, the singular forms "a," "an." and "the" include plural referents unless the context clearly dictates otherwise.

As used herein, "liquid vehicle" or "aqueous liquid vehicle" refers to water and in some examples, other components, such as, surfactants, solvents, co-solvents, anti-kogation agents, buffers, biocides, sequestering agents, viscosity modifiers, surface-active agents, and the like.

As used herein, "jetting" or "jettable" refers to compositions that are ejectable from jetting architecture, such as ink-jet architecture. In a few examples, the fluid droplet size can be less than 10 picoliters, less than 20 picoliters, less than 30 picoliters, less than 40 picoliters, less than 50 picoliters, etc. Jetting is one methodology of applying fusing agent or other fluid agents to a build material in accordance with the present disclosure.

As used herein, "kit" can be synonymous with and understood to include a plurality of compositions including one or more components where the different compositions can be separately contained in one or more containers prior to and during use, e.g., building a three-dimensional object, but these components can be combined together during a build process. The containers can be any type of a vessel, box, or receptacle made of any material.

As used herein, the term "about" is used to provide flexibility to a numerical range endpoint by providing that a given value may be "a little above" or "a little below" the endpoint. The degree of flexibility of this term can be dictated by the particular variable and determined based on experience and the associated description herein.

As used herein, a plurality of items, structural elements, compositional elements, and/or materials may be presented in a common list for convenience. However, these lists should be construed as though members of the list are individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if numerical values and sub-ranges are explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Preparation of Fusing Agents

Multiple example fusing agents were prepared using the ingredients and concentration ranges shown in Table 1.

TABLE 1

| Fusing Agents | | | |
| --- | --- | --- | --- |
| Ingredient | Component Type | Wt % Active | Wt % |
| Acriflavine HCl | Radiation Absorber | 100 | 0.5-18 |
| Propylene glycol | Organic Co-solvent | 100 | 1-40 |
| TERGITOL ® 15-s-9 | Surfactant | 100 | 0.1-1 |
| DI Water | Solvent | 100 | Balance |

TERGITOL ® 15-s-9 is a linear non-ionic surfactant that is a secondary ethoxylated alcohol, available from Dow (USA).

The fusing agents were tested for printability by loading the fusing agents into a test 2D inkjet printer and printing a test pattern on paper. The fusing agents formed a visible yellow pattern when printed, due to the yellow color of the acriflavine dye. The 2D printing tests showed that the fusing agents were easily printable using an inkjet printer. The fusing agents provided good nozzle health over time and good decap performance.

Example 2—Absorbance Testing

Figure 4:
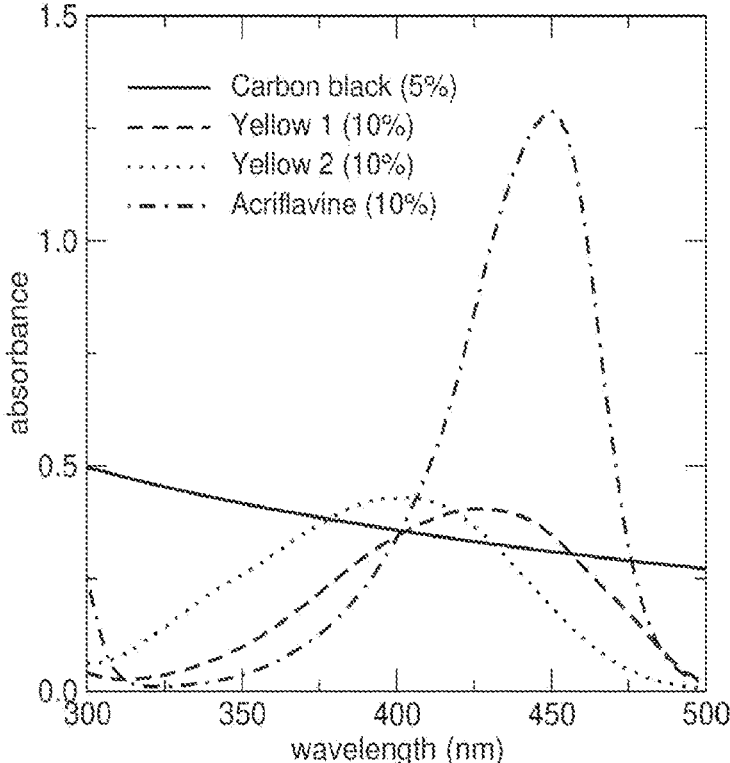
FIG. 4 illustrates an example of absorbance spectra of acriflavine compared to comparative example radiation absorbers in accordance with the present disclosure.

To investigate the radiation absorbing ability of the acriflavine dye, an absorbance spectrum of a 10 wt % acriflavine solution in water was compared to three comparative fusing agent candidates. The comparative candidates included a 5 wt % carbon black pigment dispersion and two different yellow dyes in a 10 wt % solution in water. The absorption spectra of the example acriflavine dye and the comparative examples are shown in FIG. 4. The absorptivity of the acriflavine is much higher around the 455 nm wavelength compared to the other yellow dyes and the carbon black pigment. This indicates that fusing agents that incorporate acriflavine dye can achieve a higher level of fusing than the comparative examples with the same amount of fusing agent. Alternatively, the acriflavine fusing agent can produce the same level of fusing as the comparative examples, but while using less fusing agent.

Example 3—Preparation of Three-Dimensional Objects

In order to test the fusing capability of the fusing agents, one of the example fusing agents including 8 wt % acriflavine HCl was loaded in a test HP Multi-jet Fusion 3D printer. The build material used was a thermoplastic polyamide powder. The powder bed was preheated to 92° C. Layers of the three-dimensional printed object were formed by jetting the fusing agent onto the powder bed and irradiating the powder bed using a 455 nm LED fusing lamp. Two example three-dimensional printed objects were formed in this way. The combination of the high absorptivity of the acriflavine dye and the narrow wavelength distribution of the 455 nm LED allowed for high selectivity when fusing the layers of the three-dimensional printed object. The surrounding powder bed material was left unfused and was not thermally aged by the fusing lamp. The strength of the samples was tested by hand. The samples had good strength and it was not possible to break the same objects by hand. The sample objects were stretchable with significant elongation, which suggests that the thermoplastic polyamide particles were well-fused.

While the present technology has been described with reference to certain examples, it is appreciated that various modifications, changes, omissions, and substitutions can be made without departing from the spirit of the disclosure. It is intended, therefore, that the disclosure be limited by the scope of the following claims.

What is claimed is:

1. A fusing agent for three-dimensional printing, the fusing agent consisting of:
an aqueous liquid vehicle consisting of water, an organic co-solvent, and a surfactant, wherein the water is present in an amount of from about 10 wt % to about 98 wt % with respect to a total weight of the fusing agent; and
an acriflavine dye dissolved in the aqueous liquid vehicle, wherein the acriflavine dye absorbs energy at a wavelength ranging from 350 nm to 500 nm.

2. The fusing agent of claim 1, wherein the acriflavine dye is included in an amount of from about 0.5 wt % to about 18 wt % with respect to the total weight of the fusing agent.

3. The fusing agent of claim 2, wherein the organic co-solvent is included in an amount of from about 1 wt % to about 40 wt % and the surfactant is included in an amount of from about 0.1 wt % to about 5 wt %, with respect to the total weight of the fusing agent.

4. The fusing agent of claim 1, wherein the acriflavine dye is included in an amount of from about 8 wt % to about 18 wt % with respect to the total weight of the fusing agent.

5. The fusing agent of claim 1, wherein the organic co-solvent is selected from the group consisting of 1,2 butanediol; 1,2-propanediol; 2,3-butanediol; 1,2-pentanediol; 2-methyl-2,4-pentanediol; 2-methyl-1,3-propanediol; tetrahydrofuran; ethylene glycol dimethyl ether; ethylene glycol; diethylene glycol;

triethylene glycol; propylene glycol; tripropylene glycol butyl ether; 2-pyrrolidone; 1-(2-hydroxyethyl)-2-pyrrolidone; and a combination thereof.

6. A three-dimensional printing kit, comprising:
a polymer build material including from about 80 wt % to 100 wt % of polymeric particles; and
a fusing agent consisting of an aqueous liquid vehicle and an acriflavine dye dissolved in the aqueous liquid vehicle, wherein the aqueous liquid vehicle consists of water, an organic co-solvent, and a surfactant, and wherein the water is present in an amount ranging from about 10 wt % to about 98 wt % with respect to a total weight of the fusing agent,
wherein the acriflavine dye absorbs energy at a wavelength ranging from 350 nm to 500 nm.

7. The three-dimensional printing kit of claim 6, wherein the polymeric particles comprise polyacetals, polyacrylates, polybutylene terephthalates, polycarbonates, polyesters, polyether ketones, polyethylene terephthalates, polyethylenes, polypropylenes, polystyrenes, polyurethanes, thermoplastic polyurethanes, polyamides, thermoplastic polyamides, a copolymer thereof, or a mixture thereof.

8. The three-dimensional printing kit of claim 6, wherein the polymeric particles have a D50 particle size of from about 10 μm to about 150 μm.

9. The three-dimensional printing kit of claim 6, wherein the organic co-solvent is present in an amount of from about 1 wt % to about 40 wt % with respect to the total weight of the fusing agent.

10. The three-dimensional printing kit of claim 6, further comprising a second fluid agent, wherein the second fluid agent is a coloring agent including a liquid vehicle and a colorant, or a detailing agent including a detailing compound that reduces a temperature of the build material onto which the detailing agent is applied.

11. A method for three-dimensional printing, the method comprising:
iteratively applying individual build material layers of a polymer build material including from about 80 wt % to 100 wt % of polymeric particles to a powder bed;
based on a three-dimensional object model, iteratively and selectively dispensing a fusing agent onto the individual build material layers, wherein the fusing agent consists of an aqueous liquid vehicle and an acriflavine dye dissolved in the aqueous liquid vehicle, wherein the aqueous liquid vehicle consists of water, an organic co-solvent, and a surfactant, wherein the water is present in an amount ranging from about 10 wt % to about 98 wt % with respect to a total weight of the fusing agent, and wherein the acriflavine dye absorbs energy at a wavelength ranging from 350 nm to 500 nm; and
iteratively exposing the powder bed to light energy having a peak wavelength of from about 365 nm to about 475 nm to selectively fuse the polymeric particles in contact with the acriflavine dye at the individual build material layers resulting in a fused three-dimensional object.

12. The method of claim 11, wherein the light energy is provided by a light emitting diode having peak emission wavelength of about 435 nm or about 445 nm or about 450 nm or about 455 nm or about 460 nm.

13. The method of claim 11, further comprising preheating the polymer build material to a pre-heat temperature that is from about 5° C. to about 85° C. below a melting point of the polymeric particles.

14. The method of claim 11, wherein based on the three-dimensional object model, the method further comprises iteratively applying a second fluid agent to individual build material layers, wherein the second fluid agent is a coloring agent including a liquid vehicle and a colorant, or a detailing agent including a detailing compound that reduces a temperature of the build material onto which the detailing agent is applied.

\* \* \* \* \*